(12) United States Patent
Schultz et al.

(10) Patent No.: US 11,684,000 B2
(45) Date of Patent: Jun. 27, 2023

(54) GARDEN AND LANDSCAPE TOOLS

(71) Applicant: Garden Pros Holdings LLC, Orem, UT (US)

(72) Inventors: Gloria Schultz, Tucson, AZ (US); Elton K Ongley, Sahuarita, AZ (US); Vincent H Anderson, Temecula, CA (US)

(73) Assignee: Garden Pros Holdings LLC, Orem, UT (US)

( * ) Notice: Subject to any disclaimer, the term of this patent is extended or adjusted under 35 U.S.C. 154(b) by 0 days.

(21) Appl. No.: 15/289,006

(22) Filed: Oct. 7, 2016

(65) Prior Publication Data

US 2017/0150675 A1    Jun. 1, 2017

Related U.S. Application Data

(60) Provisional application No. 62/238,691, filed on Oct. 7, 2015.

(51) Int. Cl.
| | | |
|---|---|---|
| *A01B 1/08* | (2006.01) | |
| *A01B 1/10* | (2006.01) | |
| *A01B 1/22* | (2006.01) | |
| *A01B 1/02* | (2006.01) | |
| *B07B 1/02* | (2006.01) | |
| *A01D 7/06* | (2006.01) | |
| *B07B 1/46* | (2006.01) | |

(52) U.S. Cl.
CPC ............. *A01B 1/08* (2013.01); *A01B 1/10* (2013.01); *A01B 1/22* (2013.01); *A01B 1/02* (2013.01); *A01D 7/06* (2013.01); *B07B 1/02* (2013.01); *B07B 1/4609* (2013.01)

(58) Field of Classification Search
CPC .... A01B 1/10; A01B 1/08; A01B 1/20; A01B 1/16; A01B 1/22; A01D 1/14
USPC .......................................................... 172/376
See application file for complete search history.

(56) References Cited

U.S. PATENT DOCUMENTS

| 78,561 | A | * | 6/1868 | Wood | ........................ | A01B 1/08 |
| | | | | | | 172/376 |
| 386,197 | A | * | 7/1888 | Hain | ........................ | A01B 1/08 |
| | | | | | | 172/376 |
| 422,783 | A | * | 3/1890 | Peeler et al. | ............. | A01B 1/20 |
| | | | | | | 172/375 |
| 506,336 | A | * | 10/1893 | Peddycord | ............... | A01B 1/08 |
| | | | | | | 172/376 |
| 543,266 | A | * | 7/1895 | Parcells | .................... | A01B 1/08 |
| | | | | | | 172/376 |
| 568,143 | A | * | 9/1896 | Parcells | .................... | A01B 1/08 |
| | | | | | | 172/376 |

(Continued)

FOREIGN PATENT DOCUMENTS

| CH | | 163788 | A | * | 9/1933 | ............... A01B 1/08 |
| FR | | 403010 | A | * | 10/1909 | ............... A01B 1/10 |
| GB | | 317779 | A | * | 6/1930 | ............... A01B 1/22 |

*Primary Examiner* — Thomas B Will
*Assistant Examiner* — Joan D Misa
(74) *Attorney, Agent, or Firm* — Compass IP Law PC

(57) ABSTRACT

Garden tools are provided to enable easier gardening with increased gardening and landscaping functionality. The garden tools allow the passing of material through the tool to enable improved landscaping. Certain garden tools include gratings to sift material. Certain garden tools allow material to pass through to allow easier performance of the desired gardening or landscaping function.

10 Claims, 13 Drawing Sheets

(56) References Cited

U.S. PATENT DOCUMENTS

| | | | | |
|---|---|---|---|---|
| 629,475 A * | 7/1899 | Sharpe | A01B 1/08 172/376 |
| 785,860 A * | 3/1905 | Choate | A01B 1/08 172/371 |
| 790,760 A * | 5/1905 | Stuart | A01B 1/08 172/376 |
| 870,957 A * | 11/1907 | Hilton | A01B 1/20 172/375 |
| 877,913 A * | 2/1908 | Crummer | A01B 1/08 172/376 |
| 1,132,344 A * | 3/1915 | Hills | A01B 1/08 172/376 |
| 1,234,485 A * | 7/1917 | Muckleroy | A01B 1/08 172/381 |
| 1,334,586 A * | 3/1920 | Baker | A01B 1/222 172/372 |
| 1,534,659 A * | 4/1925 | Peet | A01B 1/08 172/375 |
| 1,545,229 A * | 7/1925 | Bartran | A01B 1/22 172/371 |
| 1,549,542 A * | 8/1925 | Hejma | A01B 1/08 294/49 |
| 1,591,280 A * | 7/1926 | Carr | A01B 1/222 172/376 |
| 1,627,901 A * | 5/1927 | Hills | B27L 1/06 403/218 |
| 1,639,643 A * | 8/1927 | Arvedson | A01B 1/08 172/376 |
| 1,663,716 A * | 3/1928 | McMillan | A01B 1/08 172/376 |
| 1,768,163 A * | 6/1930 | Steinour | A01B 1/08 172/376 |
| 1,848,651 A * | 3/1932 | Peeler et al. | A01B 1/12 172/375 |
| 1,870,891 A * | 8/1932 | Bristow | A01B 1/08 172/372 |
| 1,886,178 A * | 11/1932 | Goddard | A01B 1/06 172/372 |
| 1,895,055 A * | 1/1933 | Steinour | A01B 1/12 172/376 |
| 1,966,536 A * | 7/1934 | Bevis | A01G 20/30 172/381 |
| 1,967,976 A * | 7/1934 | Smith | A01B 1/10 172/378 |
| 2,147,980 A * | 2/1939 | Koenig | A01B 1/08 172/376 |
| 2,237,988 A * | 4/1941 | Halvorsen | A01G 20/30 172/376 |
| 2,387,748 A * | 10/1945 | Cuddigan | A01B 1/06 172/360 |
| 2,662,461 A * | 12/1953 | Upson | A01B 1/12 172/380 |
| 3,435,903 A * | 4/1969 | Sherrod, Jr. | A01B 1/08 172/376 |
| 5,479,993 A * | 1/1996 | Bojar | A01B 1/06 172/372 |
| 5,495,896 A * | 3/1996 | Bojar | A01B 1/08 172/372 |
| 8,708,057 B2 * | 4/2014 | Schultz | A01B 1/08 172/376 |
| 9,775,273 B2 * | 10/2017 | Kindred | A01B 1/08 |
| 2010/0018730 A1 * | 1/2010 | Schultz | A01B 1/08 172/371 |
| 2012/0067602 A1 * | 3/2012 | Kindred | A01B 1/08 172/375 |
| 2012/0318543 A1 * | 12/2012 | Schultz | A01B 1/08 172/371 |

\* cited by examiner

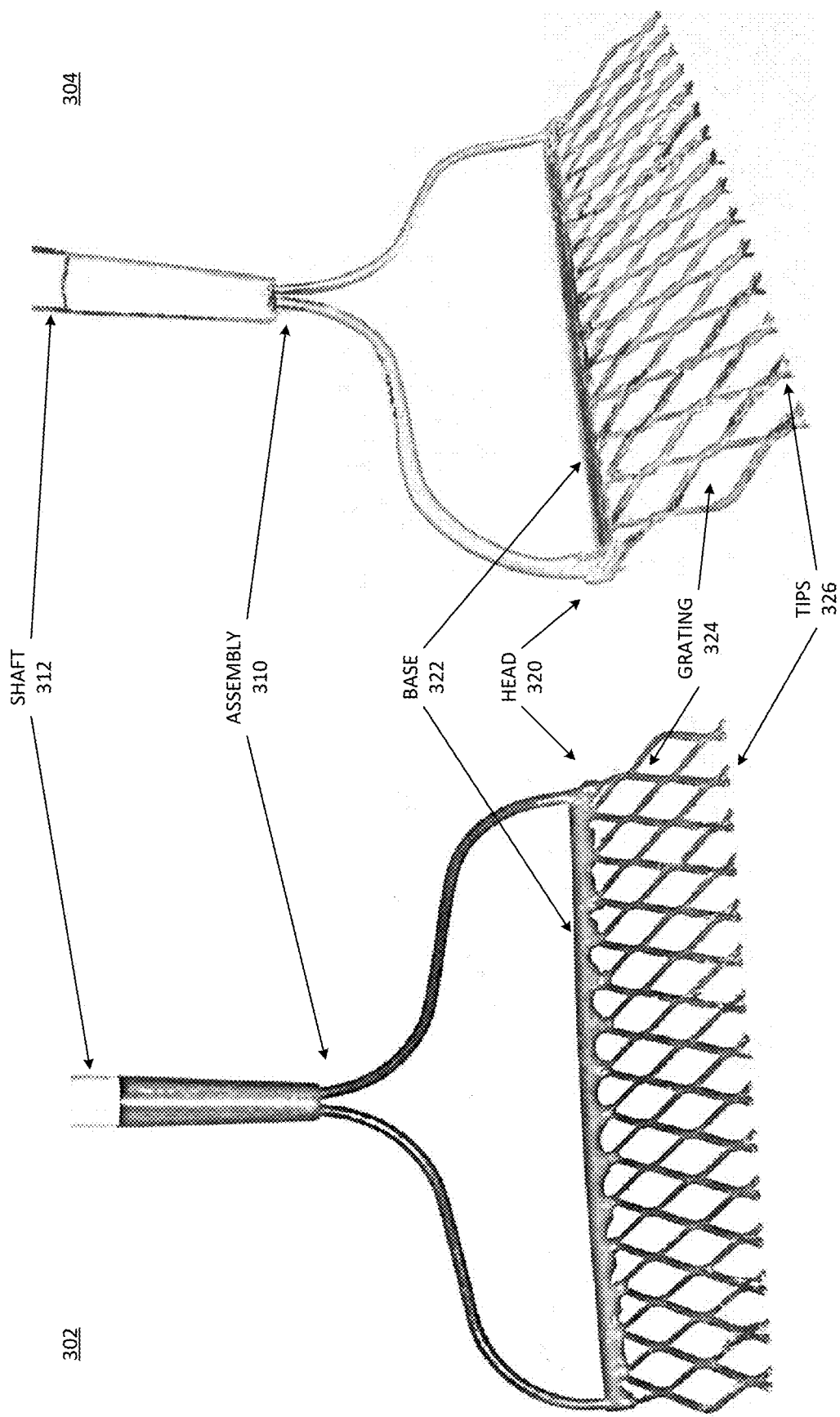

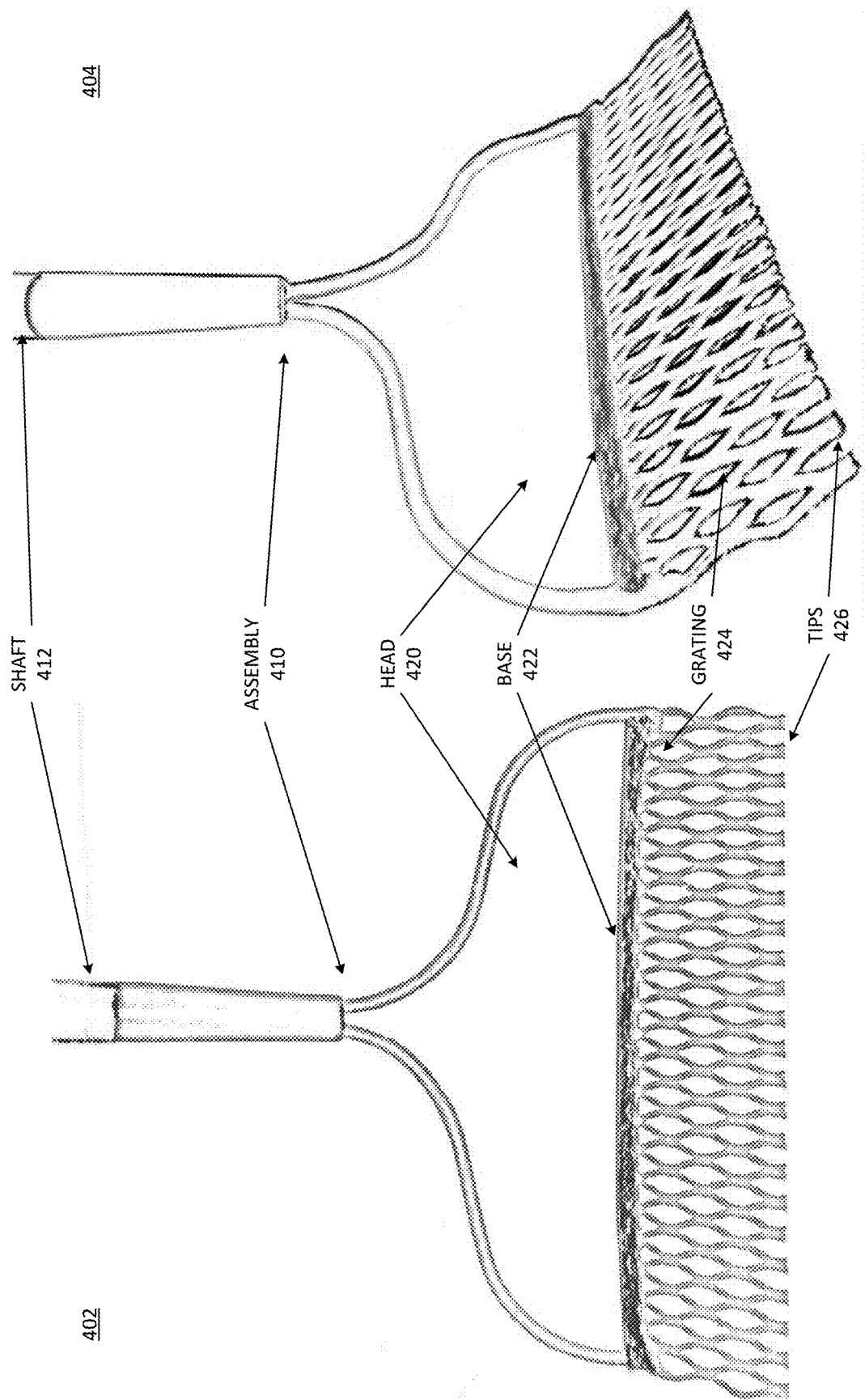

GARDEN AND LANDSCAPE TOOLS

RELATED APPLICATIONS

This application is nonprovisional application that based on U.S. Provisional Patent Application No. 62/238,691, filed Oct. 7, 2015, and claims the benefit of priority of the provisional application. The provisional patent application is hereby incorporated by reference.

FIELD

Descriptions are related generally to garden and landscaping tools.

COPYRIGHT NOTICE/PERMISSION

Portions of the disclosure of this patent document can contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto: Copyright © 2015, Gloria J. Schultz, All Rights Reserved.

BACKGROUND

Gardening is widely enjoyed by many people. People spend a great deal of time and effort tending to yards and gardens. Most of the tools used in these labors are based on tools that have been in use for thousands of years. However, there are many gardening and landscaping functions that are still very tedious or strenuous, or both. The tools developed to perform certain functions are inadequate for the task, or are functions that have been inadequately addressed and are lacking in appropriate tools. However, many tools that are developed end up being very specific to only certain tasks, and so have limited utility.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

FIG. 3A-3B are representations of an embodiment of a grated rake with a relatively large grating.

FIG. 4A-4B are representations of an embodiment of a grated rake with relatively small grating.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, various garden tools are provided to enable easier gardening with increased gardening and landscaping functionality. Various garden tools allow the passing of material through the tool to enable improved landscaping. Certain garden tools include gratings to sift material. Certain garden tools allow material to pass through to allow easier performance of the desired gardening or landscaping function. Various gardening tools provide increased functions, while also enabling many previous functions of similar tools. Thus, rather than simply increasing the number of tools in a tool shed, the tools can provide multiple tasks and increase the utility of the tools.

Figure 1:
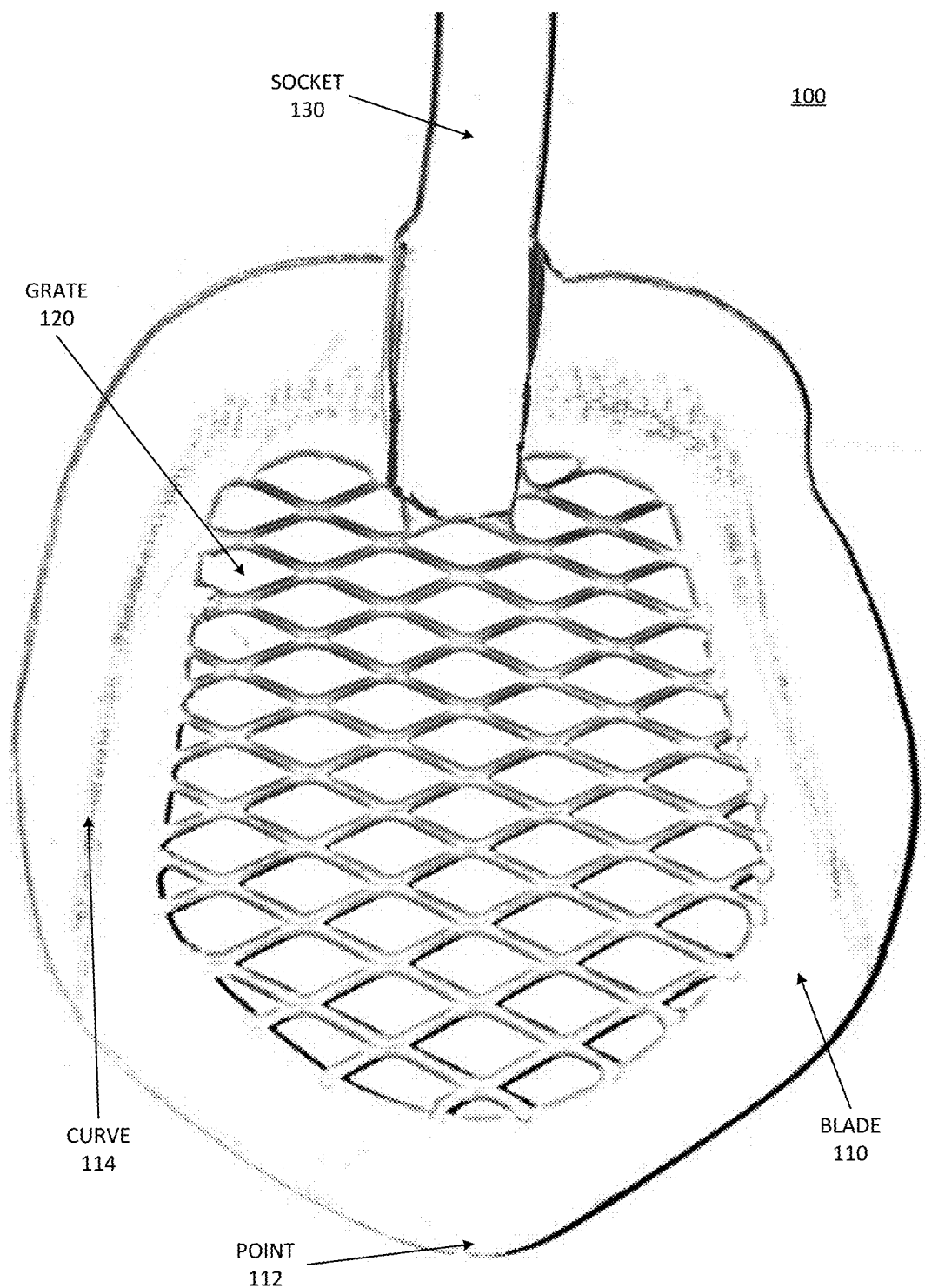
FIG. 1 is a representation of an embodiment of a grated shovel.

FIG. 1 is a representation of an embodiment of a grated shovel. The grated shovel includes a blade or base portion that is missing an inner segment, where a grate is. The combination of "grate" and "shovel" can provide a nickname of "Grovel" for the grated shovel. Shovel 100 is seen from a top perspective. Shovel 100 includes blade 110, which can also be referred to as the "body" of the shovel.

In one embodiment, blade 110 includes a first portion that is flat or has a shallow curve, which can be similar to any spade-shaped shovels or flat shovels. Blade 110 can have a general shape and size of any known shovel blade. The specific illustration of shovel 100 includes curved portions 114, which curve the base on blade 110 up into blade "sidewalls" or portions that can be considered vertical relative to a horizontal orientation of the base of blade 110. Curve 114 can have any radius of curvature, and the shape and size of blade 110 including the angle and shape of curves or sidewalls provide different implementation details that can vary from one tool design to another.

Socket 130 represents a portion of the shovel head to receive a handle or shaft portion. In one embodiment, socket 130 provide an angle of the handle to a general plane of blade 110 of approximately 38 degrees. For example, a longitudinal axis passing through the cross-sectional (e.g., cylindrical) center of socket 130 can intersect a plane that is approximately parallel with blade 110 as blade 110 rests on the ground at approximately 142 degrees, which would make the shovel handle have an angle of intersection with the ground of approximately 38 degrees when blade 110 is resting on the ground. Different angles can be used, and it is contemplated that the angles may vary from tool to tool. The inventors have found that an angle approximately between 30 and 45 degrees offer a level of ergonomic comfort. Especially an angle of approximately between 36 to 40 degrees can provide reduced stress when applying force, for individuals of average height (5'6" to 6'0").

Shovel 100 is most commonly made of metal, although plastics or other materials can also be used to manufacture shovel 100. Blade 110 can be punched, rolled, bent, or otherwise processed when metal is used. With plastics, any manufacturing technique including injection molding and plastic shaping and forming can be used. As illustrated, shovel 100 includes blade 110 with point 112. The head of shovel 100 is one example, and different blades 110 without point 112 (such as flat shovels) can be used. Thus, different shapes can be used.

Shovel 100 includes grate 120, which represents any type of grating or mesh in blade 110. As illustrated, grate 120 can provide a grating or mesh for the opening in blade 110, with a mesh of smaller openings. The smaller openings can have a generally diamond shape as illustrated, or can have any other shape. For example, grate 120 can have rectangular, square, oval, circular, elliptical, or other shaped openings. Thus, the mesh of grate 120 can be a mesh of any shape. The thickness of the material forming the openings can also be of different thickness. Thinner material can provide more openings. Heavier material tends to be sturdier and can hold up to other uses of shovel 100.

In one embodiment, grate 120 is inserted into a hole cut into blade 110. In one embodiment, blade 110 is formed with the hole or opening (e.g., without specifically removing material to form the opening). The opening is covered by grate 120. In one embodiment, grate 120 is a metal mesh that is soldered or welded onto blade 110. The opening with the grating as provided by shovel 100 can allow the sifting and separating of material of different sizes. Smaller material will filter through grate 120, while material of larger size can be lifted. Grating of different size can be used for grate 120 for different applications, to allow for sifting of different materials. For example, in one implementation of shovel 100, the tool can be used to separate debris from rocks. In addition to sifting, depending on the size of the mesh in grate 120, and the material to be used, shovel 100 can still perform a shoveling function in many cases. Thus, shovel 100 offers sifting functions, which still being functional for many traditional shoveling functions. It will be understood that certain functions (such as shoveling concrete or sand) may not work with shovel 100. However, various types of material and dirt may be able to be shoveled with grate 120 in the base of blade 110.

Figure 2:
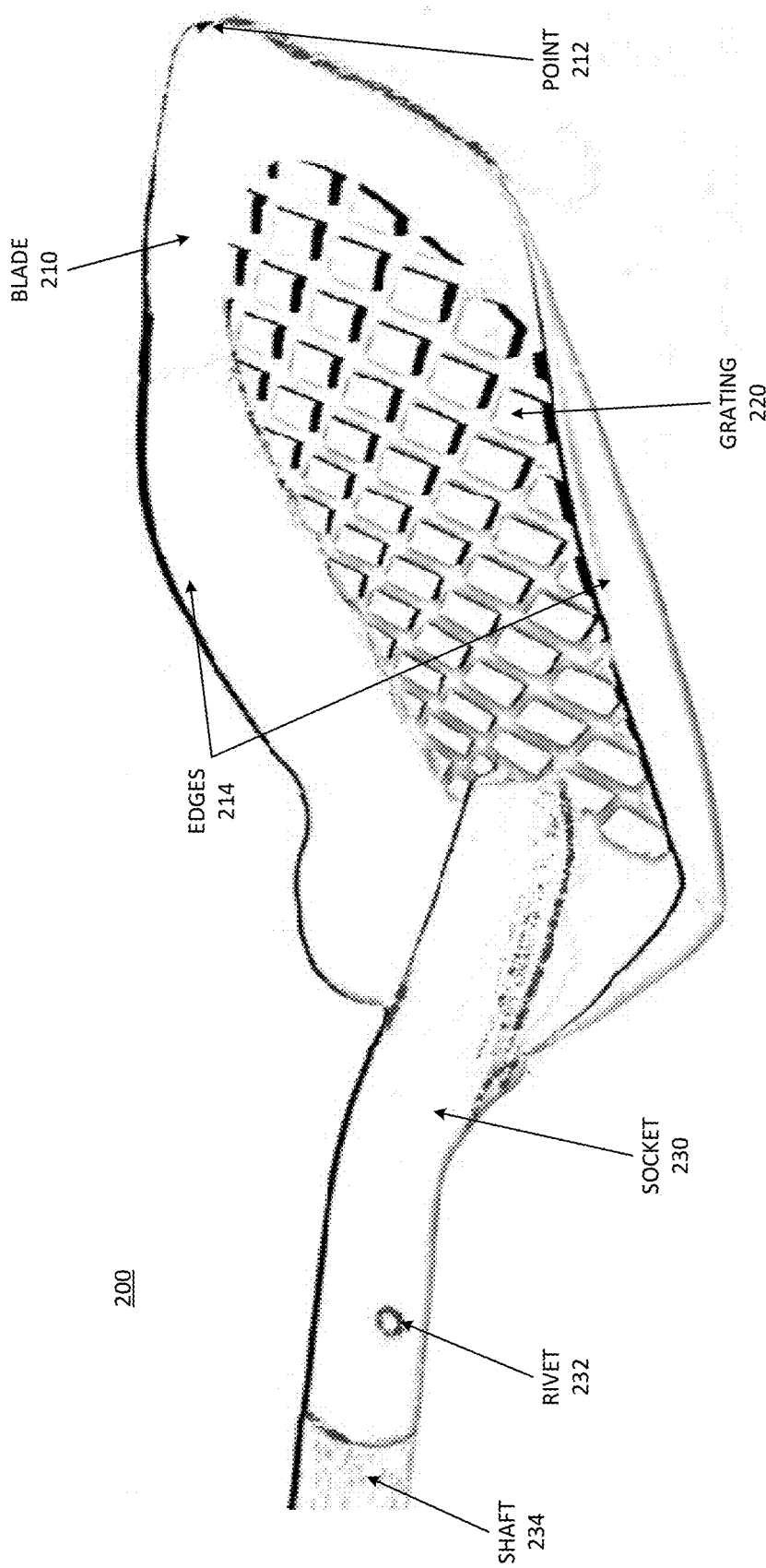
FIG. 2 is a different perspective of a representation of an embodiment of a grated shovel.

FIG. 2 is a different perspective of a representation of an embodiment of a grated shovel. Shovel 200 provides an alternative perspective of an embodiment of shovel 100 of FIG. 1. Shovel 200 more specifically illustrates edges or sidewalls 214. Edges 214 extend vertically, typically at an angle other than 90 degrees, from the base of blade 210.

Socket 230, blade 210, point 212, and grating 220 can be the same as socket 130, blade 110, point 112, and grate 120 of shovel 100. The discussion of shovel 100 above can apply equally well to shovel 200. Shovel 200 illustrates shaft 234 mounted into socket 230 with rivet 232. Shaft 234 can be a traditional wood handle, or can be any type of composite material or plastic. Shaft 234 can be any type of shaft, with or without hand grips or other features.

In one embodiment, shovel 200 includes edges 214 that have a sufficient height to provide a bin shape for blade 210. Such a bin shape can enable the holding of more material than a flat blade. Holding more material can be useful for shoveling functions, and particularly for sifting through grating 220. In one embodiment, edge 214 include or intersect with a back wall to connect to socket 230. The back wall, like edges 214, can allow shovel 200 to hold more than if the base were simply curved with little to no walls.

FIG. 3A-3B are representations of an embodiment of a grated rake with a relatively large grating. The grated rank includes a grate or grating where the traditional tines of a rake is. The tines can also be called teeth or prongs. The combination of "grate" and "rake" can provide a nickname of "Grake" for the grated rake. The rake is illustrated from a more direct, top view (looking down) in diagram 302 of FIG. 3A, and from a side perspective in diagram 304 in FIG. 3B.

The grated rake is a multifunctional, interchangeable rake and design tool with a forward and backward motion used to move multiple kinds of medium or material, or to create a design, or both. Raking an expanse of gravel, pebbles, soil, sand, or other medium is not easy. It is physically demanding and takes time. Because of the utility of the raised, expanded grate, the grated rake can enable a person to perform the same work with less energy in a way that is more ergonomic for the user. The old style tine rake requires constant, repetitive pulling motion due to the medium being moved slipping through the separated tines. To move the same amount of material with a traditional slotted tine rake requires much more motion. The grated rake can move material much more efficiently, which still allowing the sifting of material when such a function is desired.

The grated rake is illustrated in diagrams 302 and 304 to include a head assembly 310, which includes a socket to receive shaft 312 to connect to a handle for the user, as well as rods or pieces or other mechanism to connect base 322 of head 320 to shaft 312. Head includes base 322, which can be a piece of metal or other material to which grating 324 is mounted. In one embodiment, base 322 is a metal bar or metal rode to which grating 324 can be soldered or welded or otherwise adhered to the base. Base 322 can be considered part of the assembly that couples the head to shaft 312, or can be considered part of head 320 that includes the mesh of grating 324 where traditional rake tines would be.

In one embodiment, grating 324 is composed of expanded metal. Expanded metal can be made by slitting and stretching or expanding a metal sheet with a die to create diamond shaped holes or openings in one step. As mentioned above, shapes other than diamond shapes can be used, and techniques other than metal expansion can be used to form grating 324. The expanded metal provides a cost-effective manner to provide a good grating, and can be applicable to different sized meshes or gratings with different openings. In one embodiment, grating 324 includes connecting metal strands, which can be referred to as bonds, which lie on top of one another to create a raised effect. In such an embodiment, the strands and bonds can form an angle to the plane of the original, solid sheet. Raised expanded metals are also known as "regular" or "standard" expanded metal.

Expanded metal gratings can come in a variety of sizes, such as ½ inch to 1½ inches. Thus, use of such a technique can provide grating 324 with different sizes, to enable the different opening sizes. Such differences in opening sizes of the mesh of grating 324 can allow a user to choose a different grating based on the surface being worked on and kind of medium being moved. In one embodiment, base metals used to form grating 324 can be from 20 gauge up to 10 gauge. These can be standard gauge gratings which are covered by the EMMA and ASTM specifications. In an embodiment where expanded metal is used, the expanded metal can come in sheet form, making the manufacturing process for the grating fairly simple. While the grating of the grated rake is specifically discussed here, the manufacturing can be similar for the grating in the grated shovel discussed above. It will be understood that expanded metal can be slit and stretched, leaving no scrap. Thus, the use of expanded metal can provide time and energy savings, and make for cost efficient manufacturing of the grated rake, even relative to old style tine rakes.

In one embodiment, the grate or grating includes a raised expanded grate. A raised expanded grate can be a grate that is created from stamping a sheet of metal, and then pulling the metal apart to form openings. However, rather than pulling in the same plane as the sheet of metal that was stamped (i.e., in either or both of the x and y dimensions that define the plane of the metal), the pulling occurs in the +z and −z dimensions. Thus, a piece of metal that is stamped can have the farthest +x portion pulled in either +z or −z, while the farthest −x portion of the metal is pulled in the opposite direction. The metal grating thus has openings that are slightly offset one relative to the other. The use of the raised expanded grate can provide advantage over a simple two dimensional piece of metal or other flat grating. In one embodiment, a raised expanded grate provides a slightly offset pattern across the grating of the grated rake, and enhances the functionality.

Grating 324 can be manufactured to include tips 326. Tips 326 can be made in accordance with a desired design for the grated rake. Namely, as grating 324 includes a mesh of openings and arm portions or bent, meshed tine portions, the ends of grating 324 can be either open or closed. As illustrated, tips 326 are slightly open. The illustration of diagrams 302 and 304 is based on an expanded metal process, and the grating can be cut off wherever desired, to leave tips that are the joined metal, or leave some amount of opened metal. It will be understood that will lower gauge or lower thickness material for grating 324, it may be advantageous to leave tips 326 closed or nearly closed. With thicker grating material, tips 326 can expose openings the grating to offer different scraping capabilities.

Whatever manufacturing process is used, it has been found that use of the grated rake can provide an aesthetic appeal as well as having a utility purpose. The cut grating can make an impression or attractive design of waves or ripples in the soil, sand, pebbles, gravel, or medium that is being raked. Such an effect can almost effortlessly give a spiritual look and feel of a Japanese Zen garden. The grated rake can be used for a dry landscape garden, which is especially applicable with the global warming and drought conditions in some areas. The operation of the grated rake allows the sifting through material with the rake, while separating debris. Instead of simply creating designs in the material (similar to tined rakes used in Zen gardens), or using a fan-shaped rake that does not limit itself to raking the material desired, the grated rake can collect debris while allowing the desired material to stay in place.

The grated rake can be useful for raking leaves and thatching, similar to traditional rakes. The grated rake can also clean up fallen fruit or berries, which is not a functionality offered by traditional rakes. In one embodiment, grating 324 is mounted to base 322 with a similar ergonomic angle as described above. Namely, in one embodiment, when grating 324 is flat against the ground, shaft 312 can be at an angle of approximately 35 to 40 degrees. Thus, when used with tips 326 pointed down toward the ground, in one embodiment there is approximately a 140 to 145 degree angle between grating 324 and shaft 312.

FIG. 4A-4B are representations of an embodiment of a grated rake with relatively small grating. A grated rake with smaller grating openings is illustrated from a more direct, top view (looking down) in diagram 402 of FIG. 4A, and from a side perspective in diagram 404 in FIG. 4B. Reference to "smaller" is understood to be relative. The comparison of relative size of the opening can be with respect to the grated rake illustrated in diagrams 302 and 304. The design of the grated rake of diagrams 302 and 304 was made with grating openings of approximately 1.5 inches, and the grating of the grated rake of diagrams 402 and 404 was made with grating openings of approximately 0.5 inches. Other sizes are possible, whether larger openings, smaller openings, or sizes in between. The point of the diagrams is to illustrate possible differences in grating size. The difference in grating size can also be applied to a grated shovel such as the shovel described above.

Thus, the grated rake of diagrams 402 and 404 can provide similar functionality and ergonomic benefits over traditional rakes, similar to what is described above with respect to diagrams 302 and 304. The grated rake with smaller openings is illustrated in diagrams 402 and 404 to include a head assembly 410, which includes a socket to receive shaft 412 to connect to a handle for the user, as well as rods or pieces or other mechanism to connect base 422 of head 420 to shaft 412. Head includes base 422, which can be a piece of metal or other material to which grating 424 is mounted. In one embodiment, base 422 is a metal bar or metal rode to which grating 424 can be soldered or welded or otherwise adhered to the base. Base 422 can be considered part of the assembly that couples the head to shaft 412, or can be considered part of head 420 that includes the mesh of grating 424 where traditional rake tines would be.

In one embodiment, grating 424 is composed of expanded metal. Grating 424 can be manufactured to include tips 426. Tips 426 can be made in accordance with a desired design for the grated rake. Namely, as grating 424 includes a mesh of openings and arm portions or bent, meshed tine portions, the ends of grating 424 can be either open or closed. As illustrated, tips 426 are closed. The illustration of diagrams 402 and 404 is based on an expanded metal process, and the grating can be cut off wherever desired, to leave tips that are the joined metal, or leave some amount of opened metal. The closed tips 426 can make sense in grating 424 that has smaller openings to begin with. Thus, the openings in grating 424 would not likely separate much, and there can be advantage to tips 426 being the joined portions of grating 424.

The grated rake can be useful for raking leaves and thatching, similar to traditional rakes. The grated rake can also clean up fallen fruit or berries, which is not a functionality offered by traditional rakes. In one embodiment, grating 424 is mounted to base 422 with a similar ergonomic angle as described above. Namely, in one embodiment, when grating 424 is flat against the ground, shaft 412 can be at an angle of approximately 35 to 40 degrees. Thus, when used with tips 426 pointed down toward the ground, in one embodiment there is approximately a 140 to 145 degree angle between grating 424 and shaft 412.

Figures 5A, 5B:
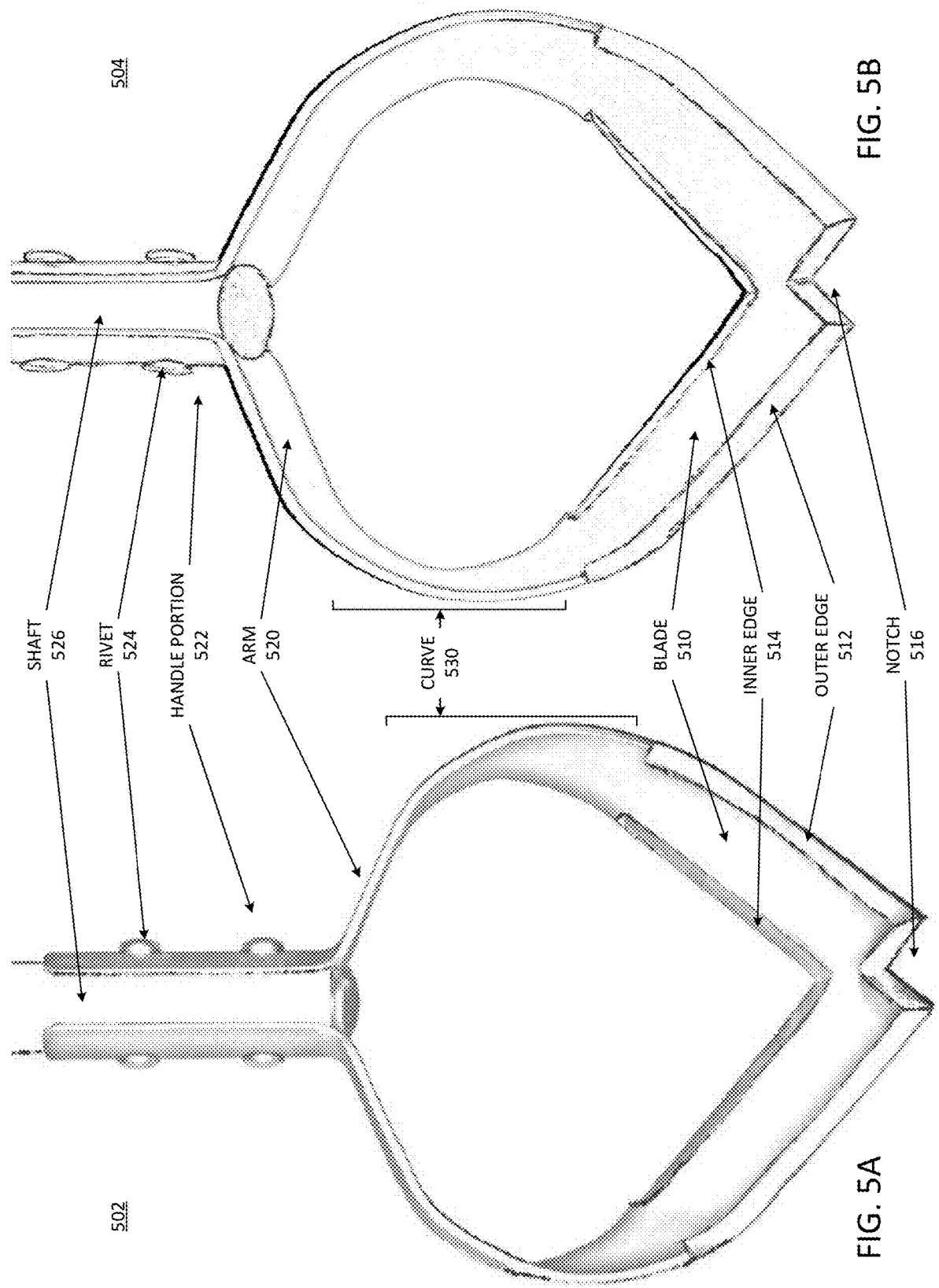
FIG. 5A-5B are representations of an embodiment of scuffle hoe with a notched blade.

FIG. 5A-5B are representations of an embodiment of scuffle hoe with a notched blade. Diagram 502 of FIG. 5A and diagram 504 of FIG. 5B provide slightly different perspectives of a scuffle hoe with a notch in the blade. The tool includes blade 510, which includes two portions in a common plane, which connect to each other. At the connection, instead of having a point, the tool include notch 516.

The tool includes arms 520, which can include a foothold or top portion of arms 520, which connect blade 510 to handle portion 522. Blade 510 is a head portion and includes a V-shaped blade with inward-facing blade edges 514 and outward-facing blade edges 512, referred to simply as "inner edge 514" and "outer edge 512", respectively. Inner edge 514 faces toward the opening of the head portion of the tool, through which debris can pass when the tool is used. Inner edge 514 is illustrated as being beveled or sharpened or both, as well as outer edge 512 being beveled or sharpened or both. Notch 516 can be sharpened or beveled or both as the rest of blade 510 to enable the notched tool to cut through dirt and weeds.

Arm 520 connects blade 510 to handle portion 522. Handle portion 522 can provide for connection to shaft or handle 526, which can be any type of shaft of different materials. Handle portion 522 can couple to shaft 526 via rivet 524 or other fastener. There can be any number and type of fasteners such as rivets 524 to enable good control from shaft 526 to the tool head. In one embodiment, rivets 524 are replaced with nuts and bolts or other connectors that enable the quick removal of the tool head from shaft 526 and quick connection of the tool head to shaft 526 (e.g., for quickly changing heads with handles).

Arm 520 connects to blade 510 via a curvature or twisting of the arm portions. Curve 530 illustrates the curvature or twisting of the arm portions to connect blade 510 to handle portion 522. Curve 530 transitions the strip constituting the blade portion from its plane up via a continuous curve to the handle portion. It will be observed how the continuous curves 530 interface up and around to the handle portion without 90 degree angles or other discrete bends (i.e., a bend at a measurable angle, as opposed to a continuous curve). Rather, there is a more elliptical curvature.

In one embodiment, curve 530 can be considered to be achieved through an "inner arc" and an "outer arc", corresponding to the inward-facing blade edge (e.g., the one facing the opening through the tool or through blade 510 and arms 520) and the outward-facing blade edge, respectively. In one embodiment, inner arc has a tighter radius than outer arc. The inner arc and outer arc are continuously curved, without discrete angles or bends in the arm portions. The curve of the outer arc is longer than curve of the inner arc, meaning it has a larger radius or moment. Thus, the arcs of the two sides (the two arms) of the tool form an elliptical region inside open region. The ellipse area by the two outer arcs can be larger than the elliptical area formed by the two inner arcs. One advantage to the arcs is the improved transfer of force applied to the handle portion over comparable tools that use 90 degree (or some other discrete angle) bends. In one embodiment there are no flat surfaces on the arm portions from where they connect to the handle portion they interface with the blade portion. This is one embodiment of an understanding of a continuous curve. Another advantage of the two arcs of different radius (or moment, considering the arcs to be elliptical rather than circular), is that the tool can be used to scoop and spread material, because when held at the right angle the tool allows for the temporary capture of material.

In one embodiment, notch 516 enables the weeding of weeds with larger roots. Notch 516 provides a recess in the tool blade where a root can catch, and enable the application of force against the tool to cut it more easily. Notch 516 can provide a user with a "feel" for where a weed is, and catch the weed to enable the user to cut it with an extra push. The shape and size of notch 516 are variable, and can be changed from one implementation to another. For purposes of example, and not by way of limitation, the notch can itself be V-shaped (a V in the opposite direction of the V shape of the blade), U-shaped, a semicircle, an arc, or another shape. The depth of the notch can also be variable. In one embodiment, the depth of the notch is between approximately $\frac{1}{10}$ to $\frac{1}{4}$ the width of the blade. Other depth of notch can also be used. In one embodiment, the pointed tip is replaced with a flattened portion that could be as wide as the notch shown, but simply be flat rather than notching back into the blade.

Figure 6:
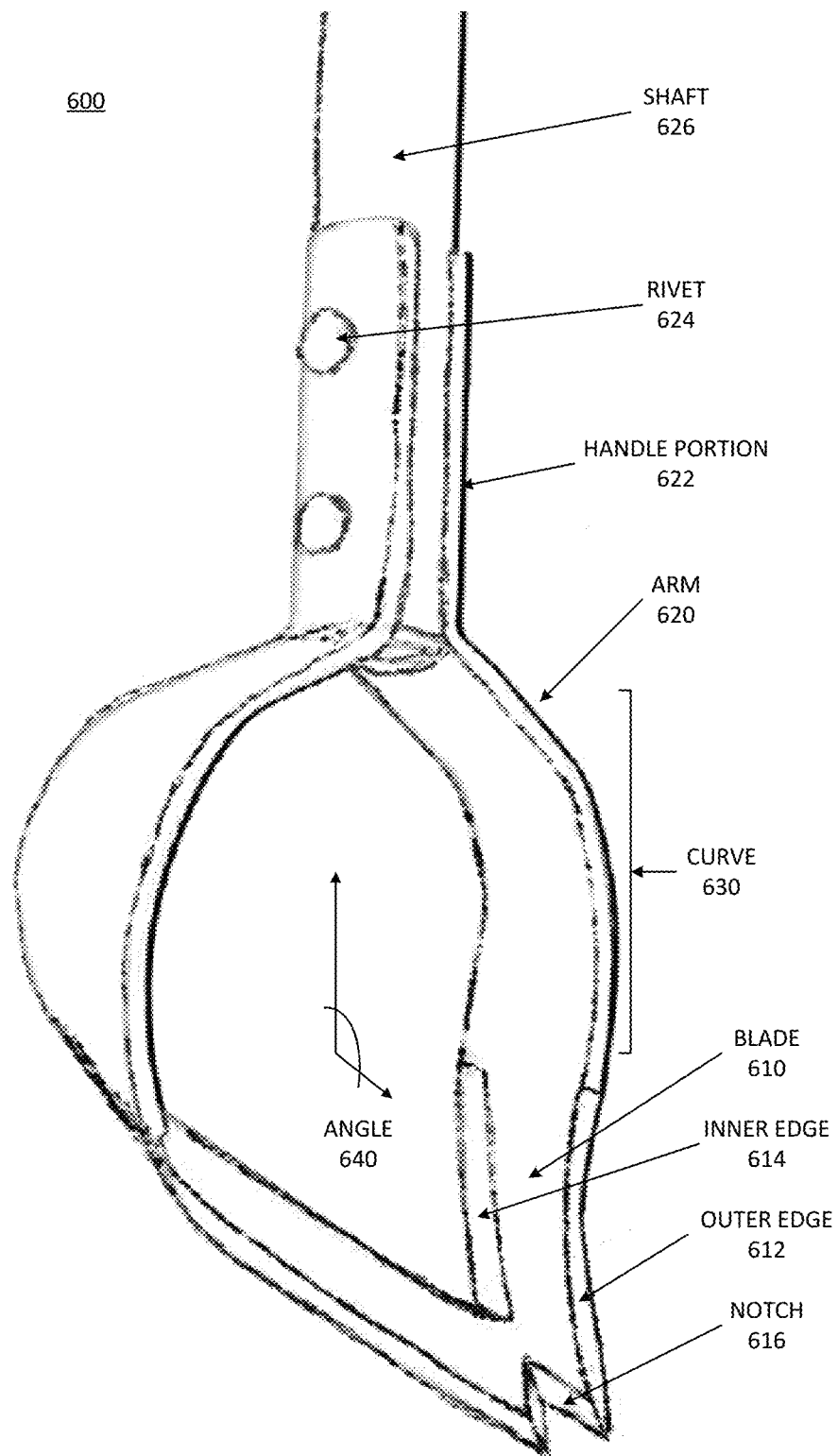
FIG. 6 is a representation of an embodiment of a scuffle hoe with a notched blade with a blade at a desired angle.

FIG. 6 is a representation of an embodiment of a scuffle hoe with a notched blade with a blade at a desired angle. Tool 600 provides an example of an embodiment of a tool in accordance with the tool illustrated in diagrams 502 and 504. Tool 600 specifically illustrates an angle at which shaft 626 is with respect to a plane of blade 610.

Blade 610 can be the same as blade 510, and the descriptions above apply here. Blade 610 includes inner edge 614, which can be sharpened and faces away from a pushing motion of the tool. Instead, inner edge 614 is used for pulling motions of the tool. Outer edge 612 faces toward a pushing motion of the tool, and engages during pushing motions. In one embodiment, blade 610 includes notch 616. Blade 610 is connected to handle portion 622 via curve 630, which is a continuous curve in accordance with what is described above. Arm 620 includes curve 630 and connects blade 610 to handle portion 622. Handle portion 622 in turn couples to shaft 626 via rivet 624 or other fastener.

In one embodiment, tool 600 can be operated with blade 610 coplanar with the ground. When blade 610 is coplanar with the ground, an axis that passes longitudinally through shaft 626 intersects the plane of blade 610 at angle 640. Angle 640 can be an angle selected for ergonomic comfort of the user of tool 600. Basing the tool design on the average height of American men and women, angle 640 can preferentially be between approximately 37 to 39 degrees. It will be understood that other angles could be used, for example, with angles between approximately 30 and 45 degrees. When angle 640 is in the range of 35 to 42 degrees, the ergonomic benefit will likely be maximized for most applications. In contrast to angle 640 that provides good ergonomic comfort and ease of use of tool 600, traditional tools have discrete bends, which include 90 degree bends. Such discrete angle bends make other tools difficult to use, and less robust.

Figure 7:
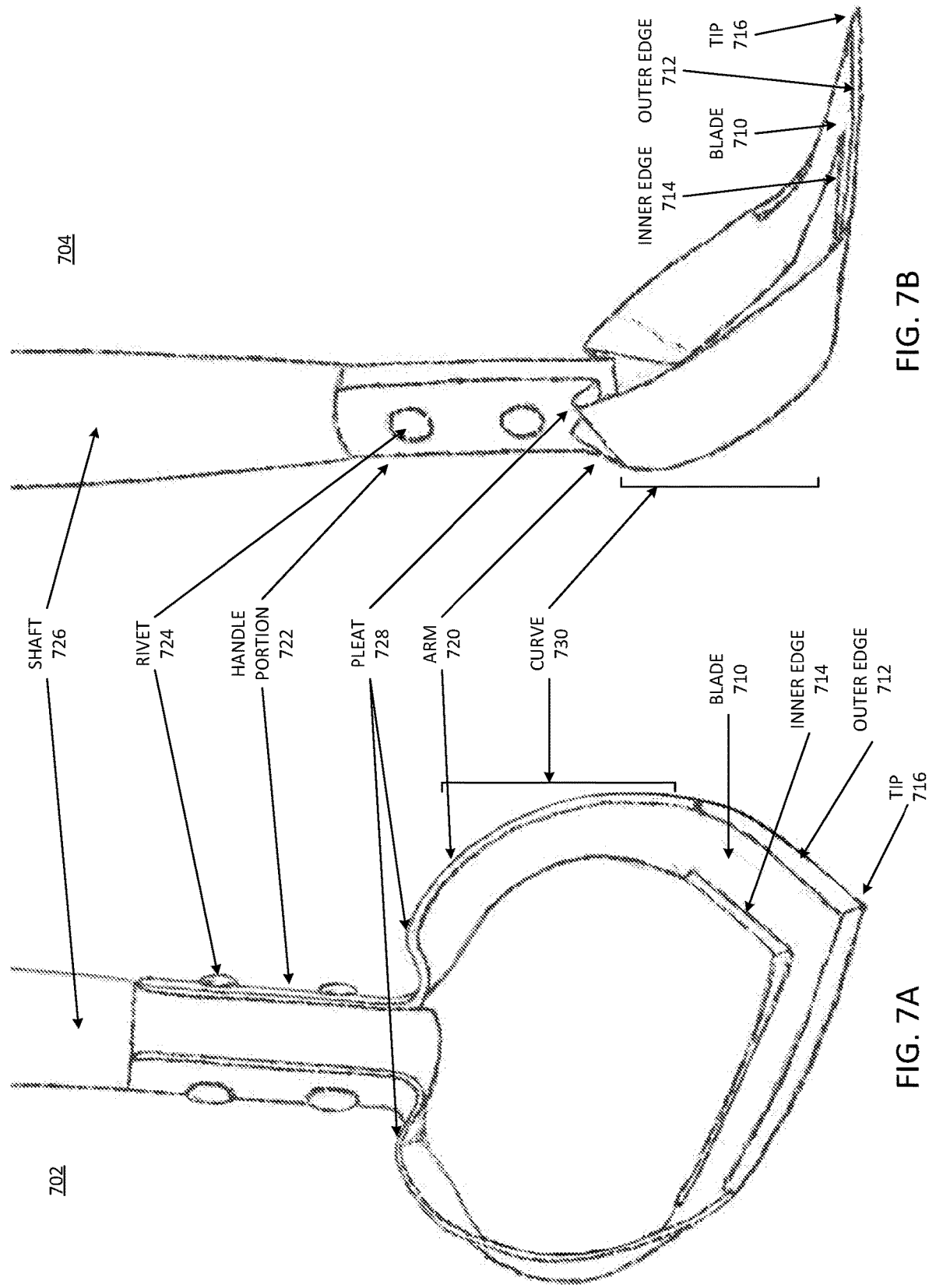
FIG. 7A-7B are representations of an embodiment of a trenching tool.

FIG. 7A-7B are representations of an embodiment of a trenching tool. The trenching tool illustrated in diagram 702 of FIG. 7A and diagram 704 of FIG. 7B can be used with overhand operation, as an alternative to a pickax and a traditional hoe. The trenching tool can be nicknamed a "trencher." The trenching tool is similar in design to the improved scuffle hoe illustrated in FIGS. 5A, 5B, and 6, but whereas the scuffle hoe provides its most ergonomic use when pushed or pulled approximately coplanar to the ground, the trenching tool is meant for overhand and possibly overhead use, similar to the motions used for a traditional pickax.

The trenching tool generally is a garden tool with a head including a handle portion; a head with a blade portion, the blade portion including a beveled, double sided V-shaped blade sharpened on both the inside and outside edges and having an open V-shaped interior to allow the tool to penetrate dirt, grass, and matter with an efficient method of loosening and moving through the dirt. The design allows the user to be able to use a forward and downward thrusting motion into the dirt with the slightly curved point of the head being able to be pulled down and forward toward the user instead of having to remove the head of the tool by a backward lifting motion like the old fashioned pickax. Because the tool has the ability to move forward through the dirt after impact, the effect is multiplied because the head is then able to loosen dirt through the pulling and lifting motion of the removal stage, rather than only pulling against the ground as a pickax. Thus, instead of hitting the dirt and getting stuck like a pick ax, the curved and open head allows the dirt to flow through and then be able to pull toward the user loosening more dirt, increasing the effect and efficiency.

The tool is easier on the body of the user because of the curved design and flow through circular movement being performed by the user. In one embodiment, the head is based on the design of the original Skidger, and has been made to curve back to allow a new motion of use (downward swinging). Blade 710 can be a V-shaped blade in accordance with any embodiment described herein. Blade 710 includes inner edge 714, which is not necessarily sharpened for a trenching tool. Blade 710 includes outer edge 712, which is preferably sharpened to improve cutting through the ground. In one embodiment, blade 710 includes tip 716, although in an alternative embodiment, blade 710 includes a notch instead of a sharpened point. Blade 710 connects to handle portion 722 via curve 730 of arms 720, where curve 730 can be in accordance with any embodiment described herein. Handle portion 722 connects to shaft 726 via rivets 724 or other fasteners (e.g., bolt, screws, or other fasteners).

In addition to curve 730, which provides a continuous curve to maximize the application of force by a user to tip 716 of blade 710 (which tip 716 is pointed or notched), in one embodiment, arm 720 includes another curve due to pleat 728, which changes the angle of a plane of blade 710 relative to shaft 726. It will be observed that shaft 726 can be more the shape of a pickax handle or an ax handle, which is thicker near the end that strikes the target. Such thickening of the shaft can help apply force to the head of the tool, and reduce the likelihood of damage or breaking. Blade 710 is lighter than a traditional pickax, but operation of the device provides that it is capable of breaking up even very hard ground, and is easier to use than a traditional pickax due to being able to move through the dirt instead of getting stuck in it. Also, the light weight makes it easier to swing.

Figure 8:
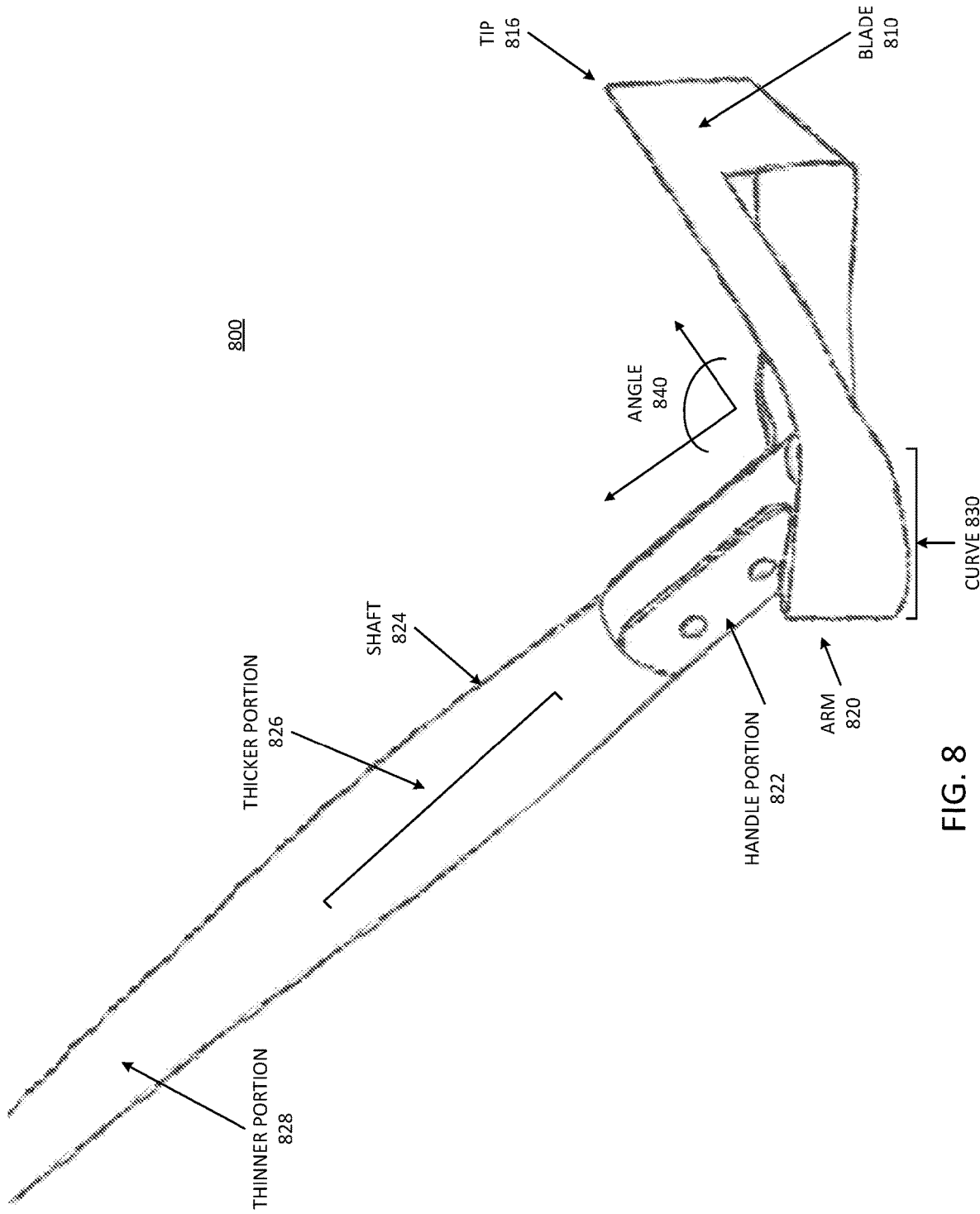
FIG. 8 is a representation of an embodiment of a trenching tool with a blade at a desired angle.

FIG. 8 is a representation of an embodiment of a trenching tool with a blade at a desired angle. Tool 800 provides one example of a trenching tool in accordance with an embodiment of the trenching tool illustrated in diagrams 702 and 704. The perspective of tool 800 can more clearly show the angle of blade 810 with respect to shaft 824. In one embodiment, shaft 824 is not a straight dowel-style or rod-style handle, and includes a thicker portion 826 at the end with the head, and a thinner portion 828 near the end the user grips. The thicker portion can support the extra stress of the downward motion. In one embodiment, the handle is the same as or based on the shape of a pickax handle.

Tool 800 illustrates similar blade 810 with tip 816, connected to handle portion 822 via arm 820 with curve 830. While a Skidger-based head is much lighter than a pickax head, making it easier to wield, in one embodiment, blade 810 is similar to a Skidger head, but is heavier and thicker. In general, trenching tool 800 is much easier to wield than a traditional pickax, and much more effective than a traditional hoe. While a traditional hoe can be used with a similar motion, it is not very effective at the motion. It will be understood that different weights of head can be made, as well as different sizes, some being larger and some being narrower.

In one embodiment, angle 840 is significantly different from the angle of a Skidger tool, such as the scuffle hoe of FIGS. 5A, 5B, and 6. Whereas the ergonomic operation of such a tool suggests the use of an angle of approximately 135 to 150 degrees between the plane of the blade and the axis of the handle shaft, the ergonomic operation of tool 800 suggests the use of an angle of approximately between 60 to 90 degrees between the plane of blade 810 and an axis of shaft 824. Angle 840 is illustrated at approximately 90 degrees in accordance with one prototype built and used to good effect. A good angle 840 can be between about 10 to 20 degrees less than perpendicular (i.e., 70-80 degrees between the shaft and the plane of the blade), although other angles also work.

In operation, tool 800 digs into the ground when swung down from either overhead, or even a height around the waist of the user. Tip 816 digs into the ground, and then when the user pulls on shaft 824, blade 810 can continue to cut into the ground toward the user. Rather than getting stuck in the ground like a pickax, tool 810 tends to break up and lift the dirt when a pulling motion is applied. Dirt can pass through or into the opening between blade 810 and arms 820, but operation of the device demonstrates that tool 800 is effective at lifting or scooping the dirt. The dirt can thus be scooped and placed to the side of the trench. Such operation is different from a pickax or a traditional hoe, both of which cannot perform any substantial scooping operation, but tend to simply push or pull the dirt up to the sides of the trench to fall back in. And in contrast to traditional trenching tools that can scoop dirt, the dirt does not get stuck in tool 800 as it tends to do with traditional scooping tools.

While a pointed blade 810 is illustrated, it will be understood that blade 810 can include a blade that varies from a specific V-shape. While the back opening may still be V-shaped, the front can be more squared or rounded off to enable more precise trenching. Thus, in one embodiment, blade 810 includes blade portions that are extended out toward tip 816.

Figure 9:
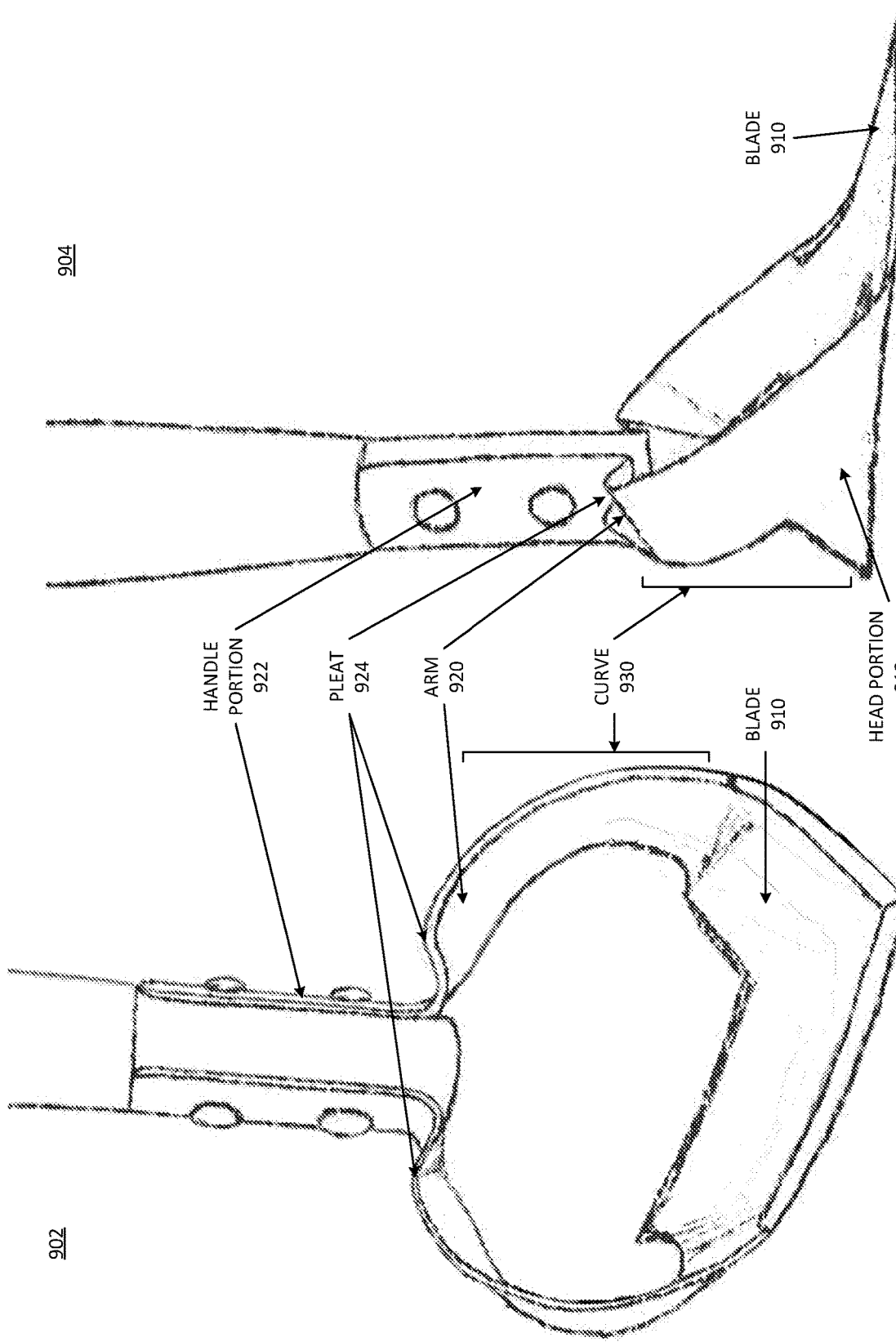
FIG. 9A-9B are representations of an embodiment of a trenching tool with a wide blade.

FIG. 9A-9B are representations of an embodiment of a trenching tool with a wide blade. The trenching tool illustrated in diagram 902 of FIG. 9A and diagram 904 of FIG. 9B are similar to, and alternatives to the trenching tool illustrated in diagram 702 of FIG. 7A and diagram 704 of FIG. 7B. The trenching tool includes blade 910, connected to handle portion 922 via arm 920 with curve 930 and including pleat 924. Descriptions above with respect to similar reference numerals and elements apply equally well to these elements, as well as the overall ergonomic improvements and the description of functions of the trenching tool.

The tool illustrated in diagrams 902 and 904 differ from what is described above in that blade 910 is specifically illustrated to have a greater width than blade 710. In addition to greater width, blade 910 could also be made thicker (referring to the weight of the metal, or the height of the strip). The width refers here to the distance from the outer edge to the inner edge. In one embodiment, blade 710 can include a width of approximately 1 to 1.5 inches. In one embodiment, blade 910 can be greater than 1.5 inches, and may have a width of multiple inches. It will be understood that while a wider blade 910 may improve the scooping function of the trenching tool, it may decrease how easily it moves through the direct. Thus, the cost and benefit of wider blade 910 must be evaluated for the intended operation, for example, a wider blade can be beneficial with looser soils.

Head portion 912 specifically refers to the thickened portion of blade 910, which extends the blade. In one embodiment, arms 920 are the same width as would normally be used, and head portion 912 interfaces the thinner arms 920 to the wider blade 910. Thus, head portion 912 can be considered the widening portion of the head to allow for a thicker blade 910. In one embodiment, the width does not have to be uniform. Diagrams 902 and 904 illustrate a substantially uniform blade 910, with relatively consistent width intended to be illustrated from the tip to head portion 912. However, in one embodiment, the tip can be thinner at the front of blade 910 than the back portion of blade 910 near head portion 912. In one embodiment, the tip can be wider at the front of blade 910 than the back portion of blade 910 near head portion 912.

Figure 10:
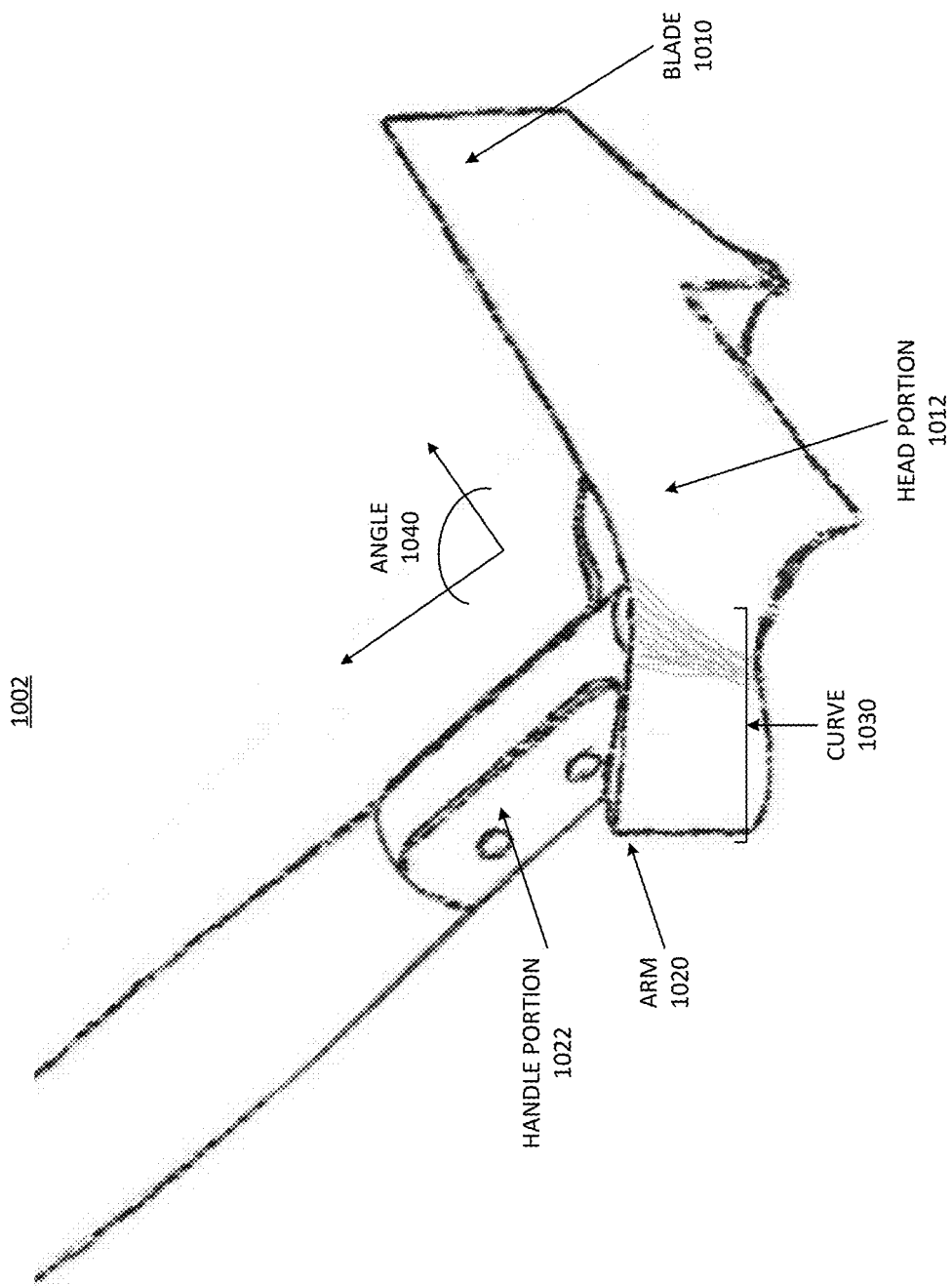
FIG. 10 is a representation of an embodiment of a trenching tool with a wide blade at a desired angle.

FIG. 10 is a representation of an embodiment of a trenching tool with a wide blade at a desired angle. Tool 1000 illustrates an example of a tool with a wider blade, in accordance with the trenching tool illustrated in diagrams 902 and 904, and is a specific example of a thick-bladed or wide-bladed tool in accordance with tool 800. Again, thickness could alternatively refer to a height of the metal used to make the blade.

Tool 1000 illustrates blade 1010 connected to handle portion 1022 via arm 1020 with or through curve 1030. Head portion 1012 specifically refers to the thickened portion of blade 1010, which extends the blade. In one embodiment, arms 1020 are the same width as would normally be used, and head portion 1012 interfaces the thinner arms 1020 to the wider blade 1010. Thus, head portion 1012 can be considered the widening portion of the head to allow for a thicker blade 1010. In one embodiment, the width does not have to be uniform. In one embodiment, the tip can be thinner at the front of blade 1010 than the back portion of blade 1010 near head portion 1012. In one embodiment, the tip can be wider at the front of blade 1010 than the back portion of blade 1010 near head portion 1012.

In one embodiment, angle 1040 is an angle of approximately between 60 to 90 degrees between the plane of blade 1010 and an axis of shaft 1024. Angle 1040 is illustrated at approximately 90 degrees in accordance with one prototype built and used to good effect. A good angle 1040 can be between about 10 to 20 degrees less than perpendicular (i.e., 70-80 degrees between the shaft and the plane of the blade), although other angles also work.

While a pointed blade 1010 is illustrated, it will be understood that blade 1010 can include a blade that varies from a specific V-shape. While the back opening may still be V-shaped, the front can be more squared or rounded off to enable more precise trenching. Thus, in one embodiment, blade 1010 includes blade portions that are extended out toward the tip.

Figures 11A, 11B:
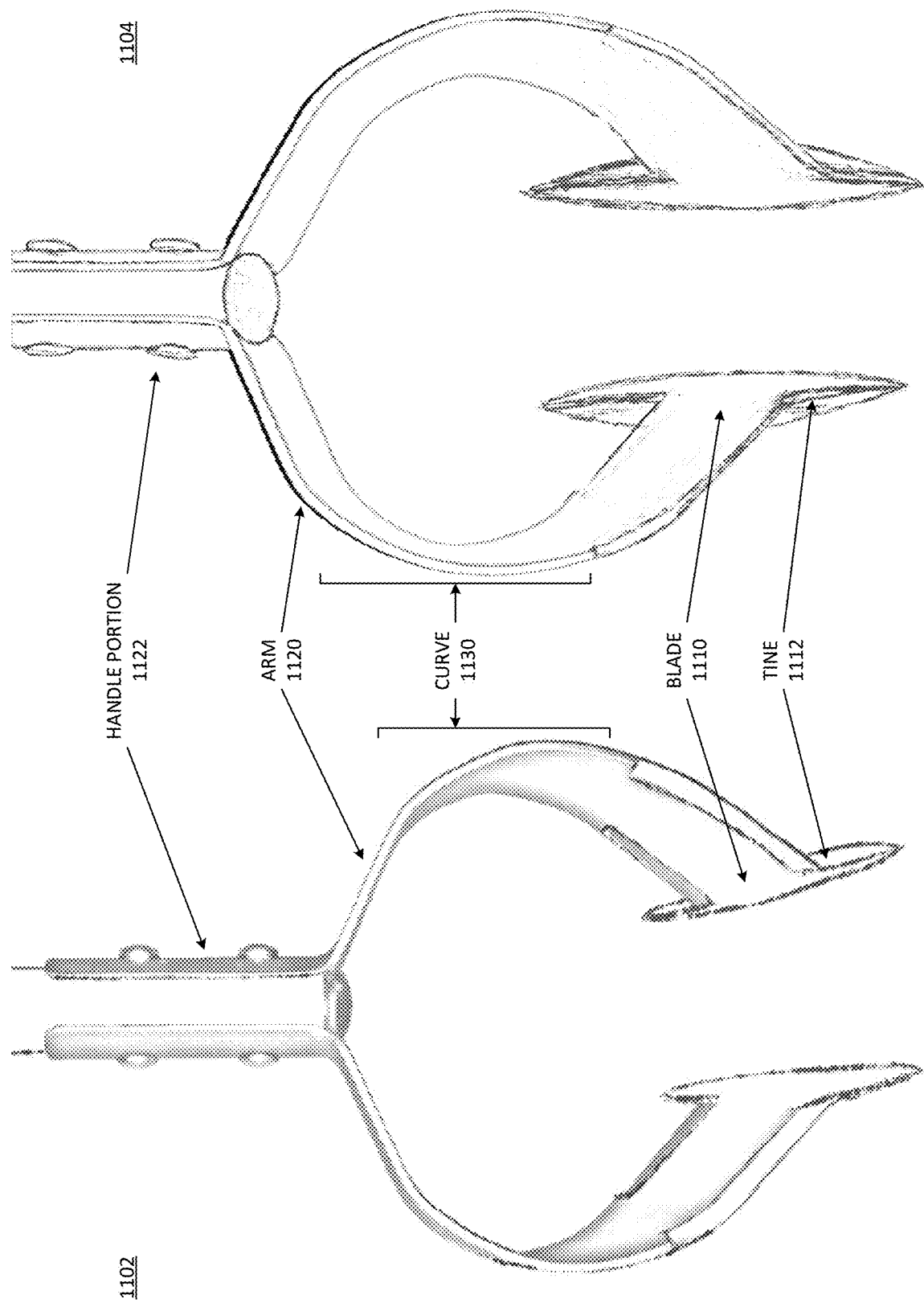
FIG. 11A-11B are representations of an embodiment of a thrashing tool.

FIG. 11A-11B are representations of an embodiment of a thrashing tool or a thrasher. The thrasher is a tool that has tines to break up ground. To get maximum force to the tines, the handle and head can be modeled on the original Skidger. In one embodiment, the tool has a head that has a continuous curve from the handle to the blade. At the blade, the blade bends down into tines, one or more on each side. Trials have demonstrated that curvature of the tines can improve the functionality of the tool. In one embodiment, the curvature can be a flare out, such as shown. A flare in could also or alternatively be made. In one embodiment, the curvature can include a twist in the tine blade (not specifically illustrated). The twist can include a curve out at one side and an opposite curve out on the other side.

Diagram 1102 of FIG. 11A and diagram 1104 of FIG. 11B provide slightly different perspectives of a thrashing tool. The tool includes blade 1110, which instead of connecting as the scuffle hoe, bend down into tines. In one embodiment, the blade portions on either side of the tool have a common plane, with tines bending down below the tool from the common plane of the tool. The tool includes arms 1120, which can include a foothold or top portion of arms 1120, where arm 1120 connects blade 1110 to handle portion 1122. Blade 1110 can include inward-facing blade edges and outward-facing blade edges, which can extend down onto tines 1112. The tines can be beveled or sharpened or both, similar to the blade on the scuffle hoe described.

Arm 1120 connects blade 1110 to handle portion 1122 via curve 1130. The curve can be in accordance with what is described above with respect to the scuffle hoe with the notch in the blade. Handle portion 1122 can provide for connection to a shaft or handle in accordance with any embodiment described herein. Arm 1120 connects to blade 1110 via a curvature or twisting of the arm portions. Curve 1130 illustrates the curvature or twisting of the arm portions to connect blade 1110 to handle portion 1122, in accordance with any embodiment described herein.

In one embodiment, notch 516 enables the weeding of weeds with larger roots. Notch 516 provides a recess in the tool blade where a root can catch, and enable the application of force against the tool to cut it more easily. Notch 516 can provide a user with a "feel" for where a weed is, and catch the weed to enable the user to cut it with an extra push. The shape and size of notch 516 are variable, and can be changed from one implementation to another. For purposes of example, and not by way of limitation, the notch can itself be V-shaped (a V in the opposite direction of the V shape of the blade), U-shaped, a semicircle, an arc, or another shape. The depth of the notch can also be variable. In one embodiment, the depth of the notch is between approximately $\frac{1}{10}$ to $\frac{1}{4}$ the width of the blade. Other depth of notch can also be used. In one embodiment, the pointed tip is replaced with a flattened portion that could be as wide as the notch shown, but simply be flat rather than notching back into the blade.

Figure 12:
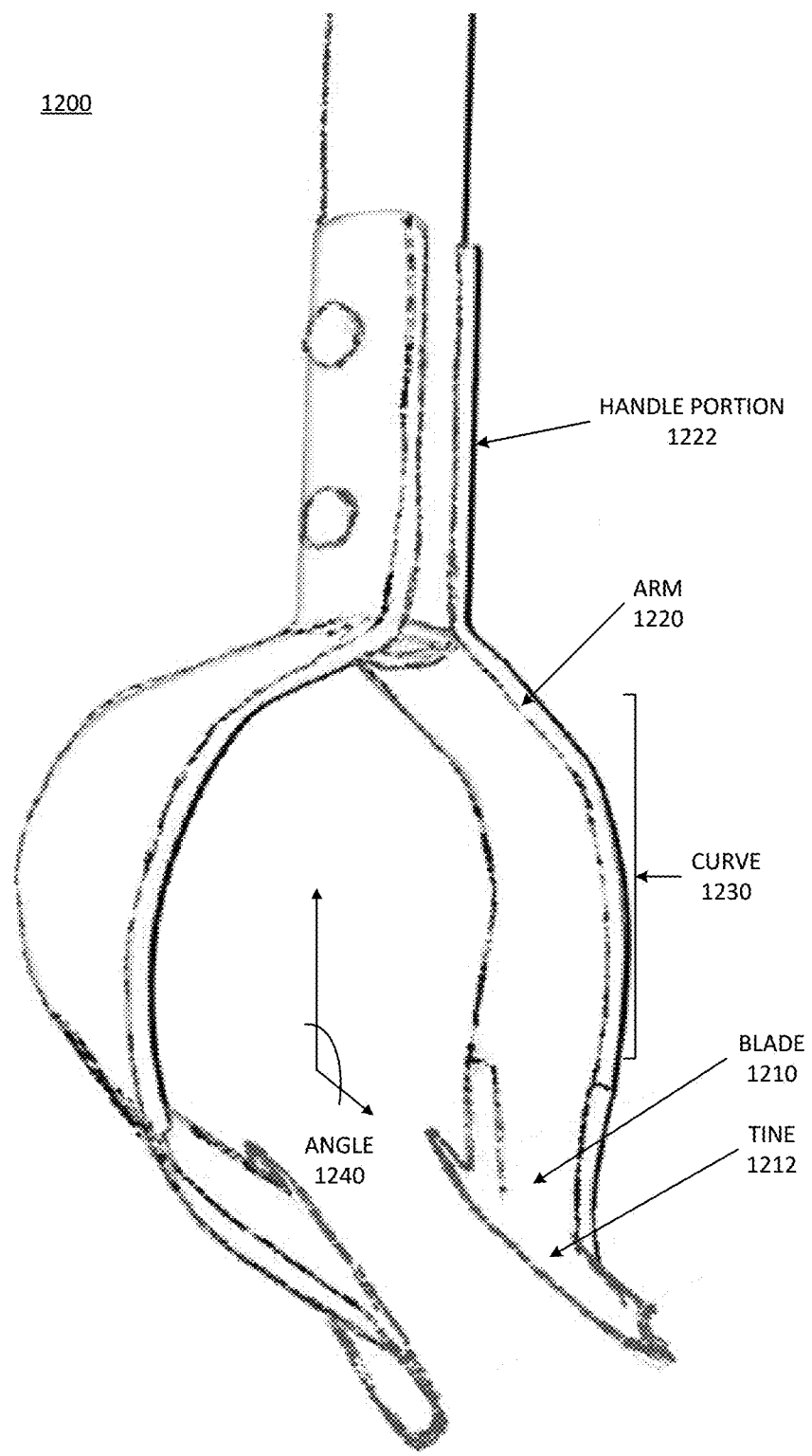
FIG. 12 is a representation of an embodiment of a thrashing tool with tines at a desired angle.

FIG. 12 is a representation of an embodiment of a thrashing tool with tines at a desired angle. Tool 1200 provides an example of an embodiment of a tool in accordance with the tool illustrated in diagrams 1102 and 1104. Tool 1200 specifically illustrates an angle at which the tool head intersects with the handle. Blade 1210 can be the same as blade 1110, and the descriptions above apply here. Blade 1210 connects to handle portion 1222 via arm 1220 with curve 1230. As illustrated, in one embodiment, blade 1210 includes a portion of the blade in a plane with the corresponding other blade portion on the other side of tool 1200. In one embodiment, the blade simply curves straight down through curve 1230 into another curve down into tines 1212.

In one embodiment, tool 1200 can be operated with blade 1210 coplanar with the ground, when the tool has a planar portion of blade 1210; the blade of 1210 is illustrated with the planar portion to describe angle 1240. When blade 1210 is coplanar with the ground, an axis that passes longitudinally through the shaft and handle portion 1222 intersects the plane of blade 1210 at angle 1240. Angle 1240 can be an angle selected for ergonomic comfort of the user of tool 1200. Basing the tool design on the average height of American men and women, angle 1240 can preferentially be between approximately 37 to 39 degrees. It will be understood that other angles could be used, for example, with angles between approximately 30 and 45 degrees. When angle 1240 is in the range of 35 to 42 degrees, the ergonomic benefit will likely be maximized for most applications. In contrast to angle 1240 that provides good ergonomic comfort and ease of use of tool 1200, traditional tools have discrete bends, which include 90 degree bends. Such discrete angle bends make other tools difficult to use, and less robust.

Tool 1200 is operated with a similar scuffle motion of scuffle hoe 600. As opposed to blade 600 sliding across the ground, blade 1200 includes tines 1200, which cut into and across the ground. Thus, they can thrash the topsoil layer. Such an operation can be useful in removing plants or weeds from an area, or simply breaking up hard soil in preparation to dig and plant. In one embodiment, the tines bend out, as illustrated. Other tine angles or bends can be used. Tines 1212 can be of various sizes and shapes, depending on the desired operation. What is illustrated in tool 1200 is merely illustrative of a tool with a thrashing head with a blade with tines connected to a handle via a continuous curve 1230, which can be a curve in accordance with any embodiment described herein. The same operation and ergonomic benefits apply to the operation of tool 1200 as with a Skidger tool, and the open blade as well as the opening in the arms enables the application of force to break up ground.

Figure 13:
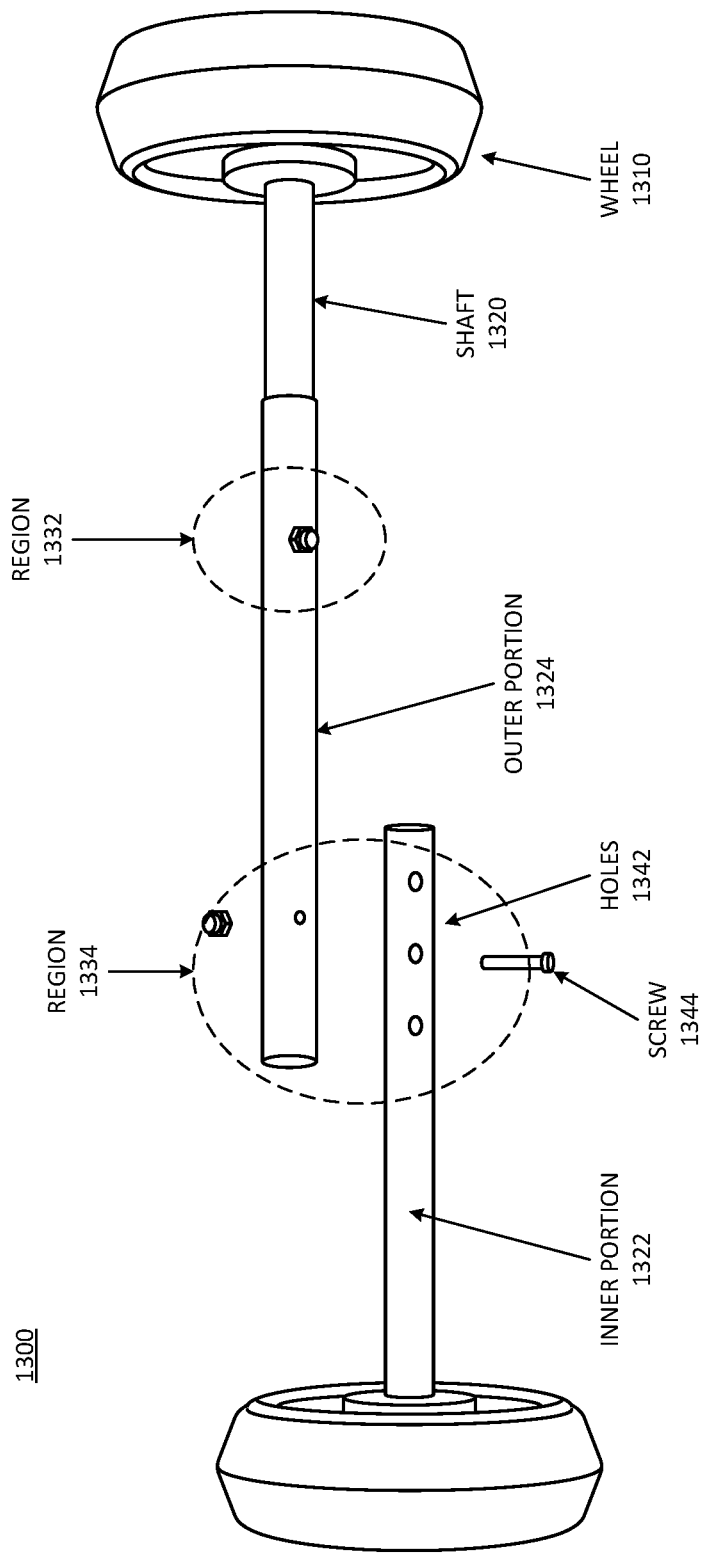
FIG. 13 is a representation of an embodiment of a wheelbarrow tool to provide wheels to a back portion of a wheelbarrow.

FIG. 13 is a representation of an embodiment of a wheelbarrow tool to provide wheels to a back portion of a wheelbarrow. Assembly 1300 is similar to a design referred to as a Wheelbarrow Buddy. The original Wheelbarrow Buddy had a fixed size, and would thus only work with selected wheelbarrow sizes. Assembly 1300 includes shaft 1320 with telescoping function. The telescoping function is enhanced by enabling the securing to different positions, which enables the same assembly 1300 to be fit to wheelbarrows of different base size. The securing mechanism can be any securing mechanism, and nuts and bolts are illustrated.

Assembly 1300 includes wheels 1310, which can be high density, non-compressible wheels. Wheels connect to shaft 1320, which can be directly-connected, or via ball bearing. Ball bearings or other mechanisms used should be designed to handle the possible heavy wheelbarrow loads. In one embodiment, wheel 1310 can spin freely around shaft 1320. Thus, in one embodiment, shaft 1320 can be mounted or fixed to the legs of the wheelbarrow, while the wheels can spin freely. Shaft 1320 can be mounted, for example, with straps, bolts, U-bolt assembly, hinge assembly, or other mechanism to secure the shaft to the legs.

Shaft 1320 can include outer portion 1324 separate from inner portion 1322. The separate outer and inner portions can enable the telescoping of the shaft to extend to match different wheelbarrow widths. Thus, wheels 1310 can be mounted just outside the legs of the wheelbarrow, whatever the width between the legs of the wheelbarrow. Such a telescoping shaft 1320 can accommodate 24 inches to more than 30 inches. Thus, whatever the width between the wheelbarrow legs, the same wheel assembly 1300 can be used. In one embodiment, outer portion 1324 has an external cross-section that is not round, for easier mounting. In one embodiment, outer portion 1324 can have an external cross-section that is not round, while having a round internal cross-section. Thus, inner portion 1322 can have a round cross-section and allow free spinning of wheels 1310, while outer portion 1324 can have a different external cross section. In one embodiment, the wheel assembly mounts via inner portions 1322 near the wheels, on the legs and feet of the wheelbarrow, while outer portion 1324 enables telescoping the wheel assembly to mount to different size wheelbarrows.

The illustration of assembly 1300 highlights region 1332, which can include a telescoping region that is assembled. The illustration of assembly 1300 highlights region 1334, which includes a telescoping region that is taken apart for viewing the details. In one embodiment, assembly 1300 includes only one telescoping region, with a fixed connection of the outer portion 1324 to the two inner portions 1322. In one embodiment, region 1332 illustrates a fixed region, where outer portion 1324 is fixed in place to the inner portion of the wheel on that side, while region 1334 enables telescoping. In one embodiment, both regions 1332 and 1334 enable telescoping.

In one embodiment, the telescoping is enabled by inner portion 1322 including multiple holes or mounting locations 1342. While the holes are in a line in assembly 1300, they can be offset in an alternate embodiment. Screw 1344 can couple outer portion 1324 to inner portion 1322 at the desired hole 1342, to provide the width desired for assembly 1300. In one embodiment, a single additional location on one side (e.g., in region 1332) can provide a small shift (e.g., a half inch difference), while region 1334 can include multiple holes 1342 (e.g., with one inch spacing differences), to enable a more precise fitting.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A garden tool comprising:
    a handle portion;
    a head with two blade portions, the blade portions being flat metal strips adjoining in a plane of the blade portions to form a V-shaped head with the blade portions, each blade portion including a bevel on outside edges of the blade portion, with an angled edge from a first surface of the metal strips of the blade portion to a second surface of the blade portion, the beveled edges adjoining to form a point of the V-shaped head;
    arm portions to connect the blade portions to the handle portion, each arm portion being an extension of the metal strip of respective blade portions, each arm portion curved between the respective blade portion and the handle portion to transfer force directly to the blade portion without introducing stress points from right-angles in the arm portions between the head and the handle portion from a thrusting force applied at the handle portion due to an impact of the head due to an overhand swinging thrust of the head into ground, each arm portion including a respective curved twist to connect the respective arm portion to the respective blade portion, the respective curved twists extending the metal strip of each respective arm portion in a continuous curve without straight edges from the respective blade portion to the handle portion, and each arm portion including a pleat with a taper in the metal strip to bend the respective arm portion near a connection to the handle portion, each pleat to curve the respective arm portion to drive force from the blade portion into the handle portion;
    wherein a combination of the curved twists and the pleats of the arm portions cause the plane of the blade portions to intersect with a longitudinal axis of the handle portion between approximately 60 and 90 degrees, with the first surface facing toward the handle portion and the second surface facing away from the handle portion; and a shaft to connect to the handle portion, the shaft with a portion to be held by a user when the garden tool is used and a portion near the head, where the portion near the head is thicker than the portion to be held, wherein the first surface is an inner surface of the arm portion, facing an opening between the blade portions and the arm portions, and the first surface is in direct contact with the shaft.

2. The garden tool of claim 1, wherein the V-shaped head with the two blade portions comprises two pieces of metal welded together at a point of the V.

3. The garden tool of claim 1, wherein the V-shaped head with the two blade portions comprises a single piece of metal.

4. The garden tool of claim 1, wherein the V-shaped head comprise a notch instead of a point of the V.

5. The garden tool of claim 1, wherein the blade portions have a greater width than the arm portions where the blade portions adjoin to form the V-shaped head.

6. The garden tool of claim 1, wherein the combination of the curved twists and the pleats of the arm portions are to cause the plane of the blade portions to intersect with the longitudinal axis of the handle portion between approximately 70 and 80 degrees.

7. The garden tool of claim 1, wherein a width of the blade portions is wider than a width of the arm portions.

8. The garden tool of claim 1, wherein a width of the blade portions is not uniform.

9. The garden tool of claim 8, wherein the width of the blade portions is greatest where the blade portions adjoin to form the V-shaped head.

10. A garden tool comprising:
a head with first and second blade portions of strips of metal that adjoin in a V-shaped point, the first and second blade portions adjoining in a plane, with top blade surfaces having an angled edge down to bottom blade surfaces;
first and second arm portions, being extensions, respectively, of the first and second blade portions, the first and second arm portions extending the strips of metal in a continuous curve without right angles from the first and second blade portions to first and second pleats in the first and second arm portions, respectively, with inner curve surfaces of the continuous curves being surfaces of the strips of metal that form the top blade surfaces, and outer curve surfaces of the continuous curves being surface of the strips of metal that form the bottom blade surfaces;
a shaft to connect to the arm portions, with the first and second arm portions having the inner curve surfaces directly adjacent the shaft, and the outer curve surfaces being away from the shaft, the shaft having a portion to be held by a user when the garden tool is used and a portion connected to the arm portions, where the portion of the shaft connected to the arm portions is thicker than the portion to be held;
each pleat being across a width of a respective strip of metal of a respective arm portion, tapered from one side of the respective strip of metal across the width, the combination of the tapered pleats and the continuous curves of the first and second arm portions to create an angle of intersection between the plane of the blade portions with a longitudinal axis of the shaft of between approximately 60 and 90 degrees.

\* \* \* \* \*